US009197682B2

(12) United States Patent
You (10) Patent No.: US 9,197,682 B2
(45) Date of Patent: Nov. 24, 2015

(54) METHOD, APPARATUS, AND COMPUTER PROGRAM PRODUCT FOR GENERATING A VIDEO STREAM OF A MAPPED ROUTE (71) Applicant: Nokia Technologies Oy, Espoo (FI)

(72) Inventor: Yu You, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 220 days.

(21) Appl. No.: 13/723,284

(22) Filed: Dec. 21, 2012

(65) Prior Publication Data
US 2014/0181259 A1   Jun. 26, 2014

(51) Int. Cl.
*G06F 15/16* (2006.01)
*H04L 29/06* (2006.01)

(52) U.S. Cl.
CPC ........ *H04L 65/4069* (2013.01); *H04L 65/4084* (2013.01); *H04L 65/4092* (2013.01); *H04L 65/602* (2013.01)

(58) Field of Classification Search
USPC ............................. 701/527; 340/989; 709/219
See application file for complete search history.

(56) References Cited

U.S. PATENT DOCUMENTS

| 6,654,019 | B2 | 11/2003 | Gilbert et al. |
| 2007/0150188 | A1* | 6/2007 | Rosenberg ..................... 701/211 |
| 2008/0319660 | A1* | 12/2008 | Horvitz et al. ................ 701/211 |
| 2009/0179895 | A1 | 7/2009 | Zhu et al. |
| 2009/0240431 | A1 | 9/2009 | Chau et al. |
| 2010/0123737 | A1 | 5/2010 | Williamson et al. |
| 2011/0211040 | A1 | 9/2011 | Lindemann et al. |
| 2012/0259545 | A1* | 10/2012 | Mitchell ....................... 701/527 |

OTHER PUBLICATIONS

International Search Report and Written Opinion for Application No. PCT/FI2013/051140 dated Apr. 9, 2014.

* cited by examiner

*Primary Examiner* — Kyung H Shin
(74) *Attorney, Agent, or Firm* — Alston & Bird LLP (57) ABSTRACT

A method, apparatus and computer program product for generating a video stream of a mapped route, where the video stream provides a perspective of traveling from one location to another at a dynamic perceived speed and from a dynamic perceived viewing angle. Metadata associated with images may provide context to waypoints along a mapped route, such as identification of landmarks or points of interest. Other context may be provided based on the use of the video stream. The perceived speed of movement along the route and perceived viewing angles in various portions of the route may therefore be altered based on the context to allow a user the chance to adequately view areas of interest.

20 Claims, 3 Drawing Sheets

METHOD, APPARATUS, AND COMPUTER PROGRAM PRODUCT FOR GENERATING A VIDEO STREAM OF A MAPPED ROUTE

TECHNOLOGICAL FIELD

An example embodiment of the present invention relates generally to mapping applications, and more particularly, to a method, apparatus and computer program product for generating video streams of a mapped route.

BACKGROUND

The widespread use of mapping technology has led to an increased demand for realistic views of real-word structures and scenery. Existing mapping applications offer 3-D views from streets, offering a panoramic and often scrollable view from the perspective of location on a map. However, current applications may require manual scrolling to view the panoramic images, and it may not be clear to a user which direction on a map or route the user is "moving." The result may be a choppy transition from one image to another, further disorienting the user from a perceived viewpoint. Additionally, a user of such an application may inadvertently skip key points or landmarks on a map based on a manual navigation.

Some improvements over panoramic images are provided in video streaming applications which generate video streams from a series of images. In systems offering a generated video stream of a street view, a navigation speed that moves too quickly may also result in a quick bypass of landmarks. In some instances, a video stream provided from a particular vantage point may exclude a view of a landmark altogether.

BRIEF SUMMARY

A method, apparatus, and computer program product are therefore provided for generating a video stream of a mapped route, where the video stream provides a perspective of traveling from one location to another at a dynamic perceived speed and from a dynamic perceived viewing angle.

A method is provided for receiving an indication of a first location and a second location, identifying at least one waypoint on a route from the first location to the second location, identifying at least one image associated with the at least one waypoint, and causing display of a video stream, with a processor, based on the at least one image, wherein the video stream provides a perspective of traveling from the first location to the second location at a dynamic perceived speed and from a dynamic perceived viewing angle. In some embodiments, the method may include causing a change in at least one of the perceived speed or the perceived viewing angle for at least one portion of the video stream based on a user input, and/or automatically causing a change in at least one of the perceived speed or the perceived viewing angle for at least one portion of the video stream based on a context. The method may additionally include receiving metadata associated with the at least one waypoint, and automatically causing a change in at least one of the perceived speed of the perceived viewing angle for at least one portion of the video stream based on the metadata. The method may include generating a second video stream providing a perspective of traveling from the second location to the first location at a dynamic perceived speed and from a dynamic perceived viewing angle. The at least one image may include overlapping images associated with the at least one waypoint.

An apparatus is provided, including at least one processor and at least one memory including computer program code, the at least one memory and the computer program code configured to, with the processor, cause the apparatus to at least receive an indication of a first location and a second location, identify at least one waypoint on a route from the first location to the second location, identify at least one image associated with the at least one waypoint, and cause display of a video stream based on the at least one image, wherein the video stream provides a perspective of traveling from the first location to the second location at a dynamic perceived speed and from a dynamic perceived viewing angle.

In some embodiments, the at least one memory and the computer program code are further configured to, with the processor, cause the apparatus to at least cause a change in at least one of the perceived speed or the perceived viewing angle for at least one portion of the video stream based on a user input, automatically cause a change in at least one of the perceived speed or the perceived viewing angle for at least one portion of the video stream based on a context, receive metadata associated with the at least one waypoint, automatically cause a change in at least one of the perceived speed of the perceived viewing angle for at least one portion of the video stream based on the metadata, and/or generate a second video stream providing a perspective of traveling from the second location to the first location at a dynamic perceived speed and from a dynamic perceived viewing angle. The at least one image comprises overlapping images associated with the at least one waypoint.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Figure 1:
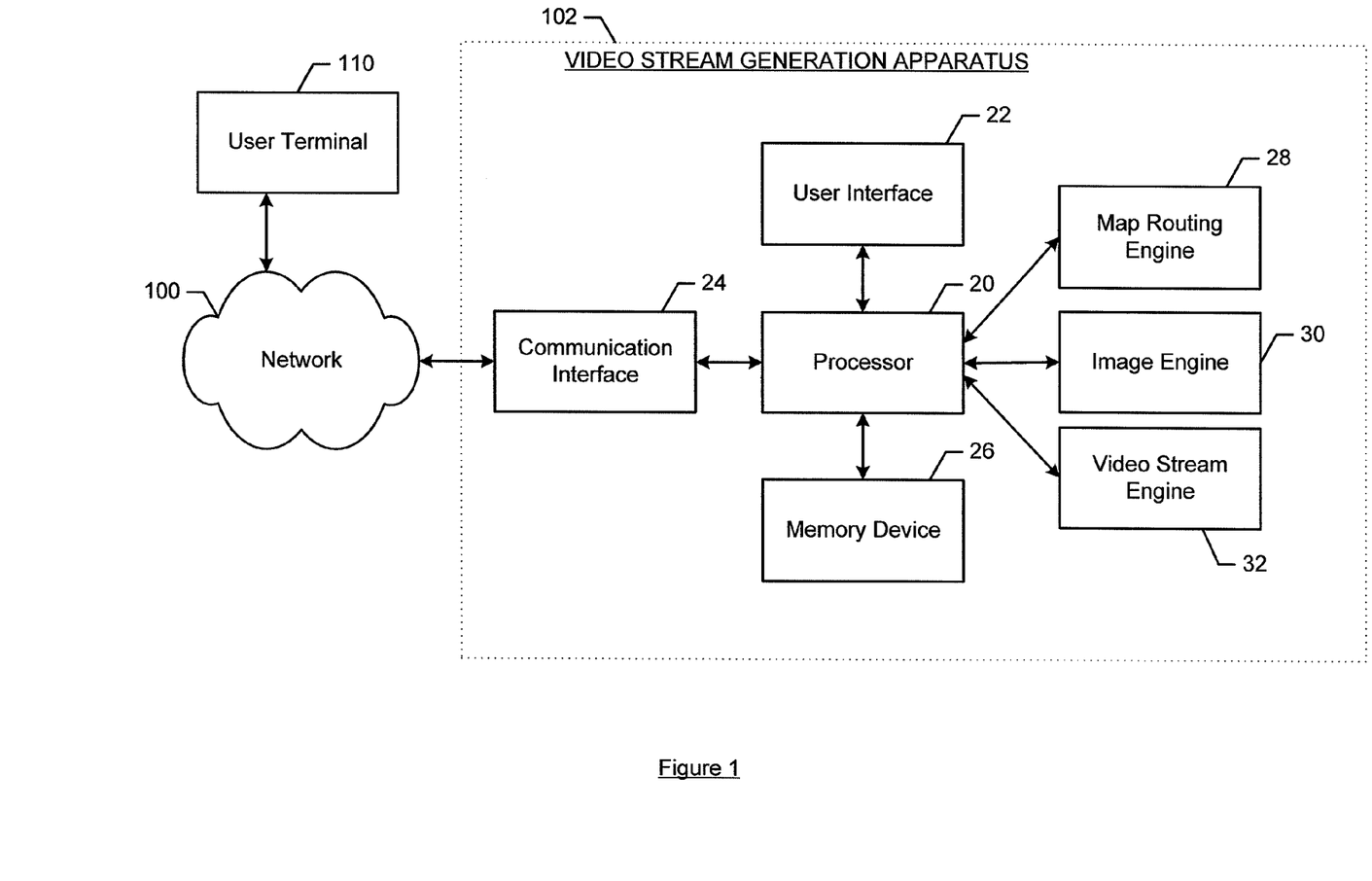
FIG. 1 is a block diagram of a video stream generation apparatus that may be configured to implement example embodiments of the present invention.

As described below, a method, apparatus and computer program product are provided for generating a video stream of a mapped route, where the video stream provides a perspective of traveling from one location to another at a dynamic perceived speed and from a dynamic perceived viewing angle. Embodiments of the claimed invention may be useful in navigation applications, allowing a user to understand their surroundings and positioning of storefront or other landmarks relative to each other along the route. Some embodiments may be beneficial in "walkthrough" applications, where the video stream is used to tour a specific area. Referring to FIG. 1, video stream generation apparatus 102 may include or otherwise be in communication with processor 20, user interface 22, communication interface 24, memory device 26, and map routing engine 28. Video stream generation apparatus 102 may be embodied by a wide variety of devices including mobile terminals, e.g., mobile telephones, smartphones, tablet computers, laptop computers, or the like, computers, workstations, servers or the like and may be implemented as a distributed system or a cloud based entity.

In some embodiments, the processor 20 (and/or co-processors or any other processing circuitry assisting or otherwise associated with the processor 20) may be in communication with the memory device 26 via a bus for passing information among components of the video stream generation apparatus 102. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present invention. For example, the memory device 26 could be configured to buffer input data for processing by the processor 20. Additionally or alternatively, the memory device 26 could be configured to store instructions for execution by the processor 20.

The video stream generation apparatus 102 may, in some embodiments, be embodied in various devices as described above. However, in some embodiments, the video stream generation apparatus 102 may be embodied as a chip or chip set. In other words, the video stream generation apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The video stream generation apparatus 102 may therefore, in some cases, be configured to implement an embodiment of the present invention on a single chip or as a single "system on a chip." As such, in some cases, a chip or chipset may constitute means for performing one or more operations for providing the functionalities described herein.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed. However, in some cases, the processor 20 may be a processor of a specific device (e.g., a mobile terminal or network entity) configured to employ an embodiment of the present invention by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the video stream generation apparatus 102. More specifically, the communication interface 24 may be configured to receive requests from the user terminal 110, such as a starting point and destination, and transmit generated video streams of a mapped route between the two points, back to user terminal 110. In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms.

In some embodiments, such as instances in which the video stream generation apparatus 102 is embodied by a user device, the video stream generation apparatus 102 may include a user interface 22 that may, in turn, be in communication with the processor 20 to receive an indication of a user input and/or to cause provision of an audible, visual, mechanical or other output to the user. As such, the user interface 22 may include, for example, a keyboard, a mouse, a joystick, a display, a touch screen(s), touch areas, soft keys, a microphone, a speaker, or other input/output mechanisms. Alternatively or additionally, the processor 20 may comprise user interface circuitry configured to control at least some functions of one or more user interface elements such as, for example, a speaker, ringer, microphone, display, and/or the like. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like).

In some example embodiments, processor 20 may be embodied as, include, or otherwise control a map routing engine 28 for performing mapping and routing functionalities as described herein. As such, the map routing engine 28 may be embodied as various means, such as circuitry, hardware, a computer program product comprising computer readable program instructions stored on a computer readable medium (for example, memory device 26) and executed by a processing device (for example, processor 20), or some combination thereof. Map routing engine 28 may be capable of communication with one or more of the processor 20, image engine 30, video stream engine 32, memory device 26, user interface 22, and communication interface 24 to access, receive, and/or send data as may be needed to perform one or more of the mapping and routing functionalities as described herein.

In some example embodiments, processor 20 may be embodied as, include, or otherwise control an image engine 30 for performing functionalities associated with retrieving images as described herein. As such, the image engine 30 may be embodied as various means, such as circuitry, hardware, a computer program product comprising computer readable program instructions stored on a computer readable medium (for example, memory device 26) and executed by a processing device (for example, processor 20), or some combination thereof. Image engine 30 may be capable of communication with one or more of the processor 20, map routing engine 28, video stream engine 32, memory device 26, user interface 22, and communication interface 24 to access, receive, and/or send data as may be needed to perform one or more of the functionalities associated with retrieving images as described herein.

In some example embodiments, processor 20 may be embodied as, include, or otherwise control a video stream engine 32 for performing functionalities associated with generating video streams as described herein. As such, the video stream engine 32 may be embodied as various means, such as circuitry, hardware, a computer program product comprising computer readable program instructions stored on a computer readable medium (for example, memory device 26) and executed by a processing device (for example, processor 20), or some combination thereof. Video stream engine 32 may be capable of communication with one or more of the processor 20, map routing engine 28, image engine 30, memory device 26, user interface 22, and communication interface 24 to access, receive, and/or send data as may be needed to perform one or more of the video stream generation functionalities as described herein.

Any number of user terminal(s) 110 may connect to video stream generation apparatus 102 via a network 100. User terminal 110 may be embodied as a mobile terminal, such as personal digital assistants (PDAs), pagers, mobile televisions, mobile telephones, gaming devices, laptop computers, tablet computers, cameras, camera phones, video recorders, audio/video players, radios, global positioning system (GPS) devices, navigation devices, or any combination of the aforementioned. The user terminal 110 need not necessarily be embodied by a mobile device and, instead, may be embodied in a fixed device, such as a computer or workstation.

Network 100 may be embodied in a local area network, the Internet, any other form of a network, or in any combination thereof, including proprietary private and semi-private networks and public networks. The network 100 may comprise a wire line network, wireless network (e.g., a cellular network, wireless local area network, wireless wide area network, some combination thereof, or the like), or a combination thereof, and in some example embodiments comprises at least a portion of the Internet. As another example, a user terminal 110 may be directly coupled to and/or may include a video stream generation apparatus 102.

Figure 2:
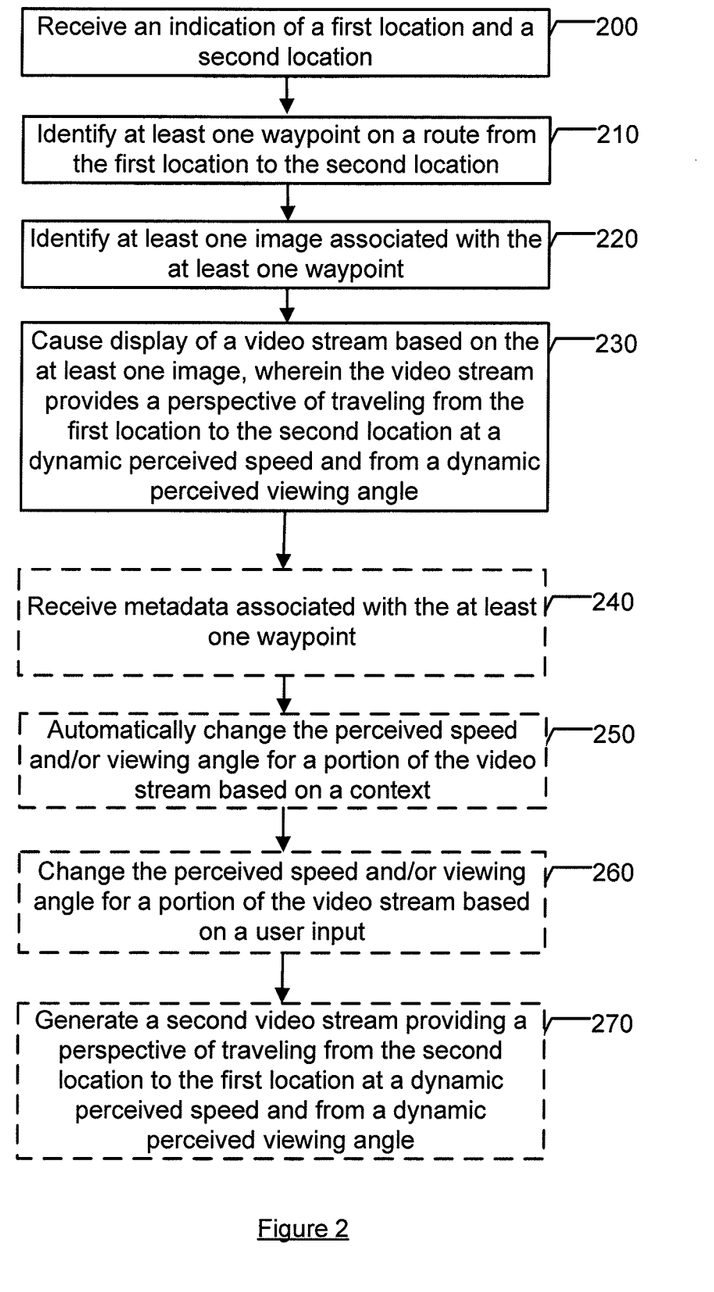
FIG. 2 is a flowchart illustrating operations to generate a video stream of a mapped route in accordance with one embodiment of the present invention.

Referring now to FIG. 2, the operations for generating a video stream of a mapped route are outlined in accordance with one example embodiment. As shown by operation 200, the video stream generation apparatus 102 may include means, such as the processor 20, communication interface 24, map routing engine 28, or the like, for receiving an indication of a first location and a second location. In an example embodiment, a user may provide location information, such as an address or intersection, for example, of the first location (e.g., starting point) and/or the second location (e.g., destination). Additionally or alternatively, the locations may be selected on a map, or inferred from Global Positioning System (GPS) location information.

Figure 3:
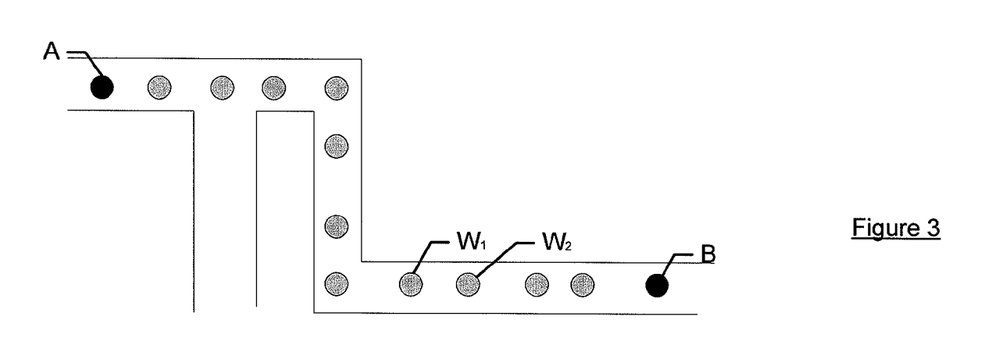
FIG. 3 is an example mapped route including waypoints, in accordance with one embodiment of the present invention.

Continuing to operation 210, the video stream generations apparatus 102 may include means, such as the processor 20, map routing engine 28, or the like, for identifying at least one waypoint on a route from the first location to the second location. As such, the map routing engine 28 may provide a route from a first location, such as point A of FIG. 3, and a second location, such as point B. A route may be determined based on various parameters, such as for example, if a user would like to view a video stream from the perspective of a moving vehicle or a pedestrian. Depending on from which perspective the video stream is to be viewed, the route may vary. At least one waypoint, such as point(s) W, may be identified along the route. Waypoints may be equally spaced, or unequally spaced. They may be identified at random, or based on landmarks or the quantity of images available and associated with the waypoint, as described in further detail with respect to operation 220. Waypoints may be defined by an absolute location such as GPS coordinates, longitude and longitude, and/or an address, for example. Waypoints may additionally or alternatively be defined by any method of identification which may allow the video stream generation apparatus 102 to identify associated images, that is, images taken from a viewpoint at, or substantially close to the associated waypoint.

Figure 4A:
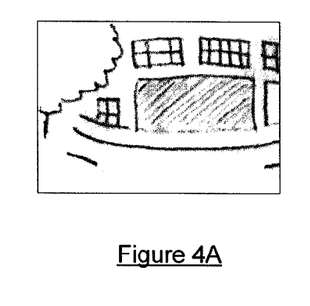
FIGS. 4A-4C are example images that may be used to generate a video stream in accordance with one embodiment of the present invention.
Figure 4B:
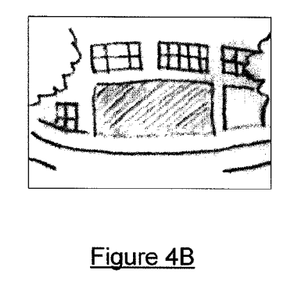
Figure 4C:
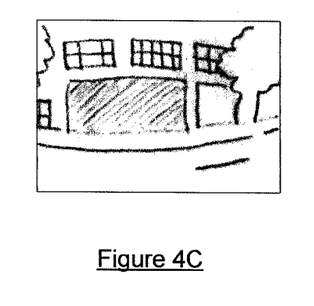

The video stream generation apparatus 102 may include means, such as a processor 20, or image engine 30, for identifying at least one image associated with the at least one waypoint, as indicated by operation 220. Example images are shown in FIGS. 4A-4C. The image of FIG. 4A is an example image that may be associated with waypoint $W_1$, which may have been captured from the location of $W_1$. The image of FIG. 4B is an example image that may be associated with waypoint $W_2$. The image of FIG. 4C is an example image that may also be associated with waypoint $W_2$. In an example embodiment, the images identified by the image engine 30 may include multiple overlapping images, and/or images captured from different angles. In some embodiments, 360-degree panoramic images may be available, in which case, the image engine 30 may crop a portion or portions of the 360-degree panorama to arrive at one or more images that may subsequently be used to generate a video stream, as described in further detail with respect to operation 230.

Images utilized by the video stream generation apparatus 102, and/or imagine engine 30 may be obtained by various means. One method includes LiDAR (Light Detection and Ranging) which enables still images to be rapidly captured by a vehicle traveling by or in close proximity to a waypoint. The images may be captured and archived in a database, and associated with the positioning information of the waypoint for future retrieval. Images may be accessed on memory device 26, or in some embodiments, from the cloud (e.g., external server), over network 100.

Continuing to operation 230, the video stream generation apparatus 102, may include means, such as processor 20, or video stream engine 32, for causing display of a video stream based on the at least one image, and where the video stream provides a perspective of traveling from the first location to the second location at a dynamic perceived speed and from a dynamic perceived viewing angle. In order to generate such a video stream, the video stream engine 32 may use images identified with respect to operation 220, and encode them as a video stream. As such, sequences of images may be advantageously linked together using various animation processes to arrive at a video stream. In some embodiments, frames may be identified, and incorporated into a video stream based on the angle from which the image was captured, and/or a desired perceived viewing angle. A video stream generated from the example images of FIGS. 4A-4C may provide a natural and realistic transition from the image of FIG. 4A, to the image of FIG. 4B, and to the image of FIG. 4C, where each image may represent a frame in the video stream. The transition in the video stream may provide a perceived view from a person or other viewing object traveling along the route.

In embodiments where relatively larger numbers of images are available (either in their provided state, and/or cropped and processed by video stream engine 32) the changes from one frame to another may be more subtle than the changes from frame to frame in an embodiment utilizing a fewer number of images. As such, incorporating a relatively higher number of images may allow video stream engine 32 to produce a video stream at a higher frame rate (e.g., frames per second), and thus having a better quality and/or smoother transitions.

In some embodiments, key frames may mark the start and/or end of a smooth transition, and may be represented by a frame (e.g. singular image) of an outermost available image associated with a waypoint, where an overlapping image associated with a subsequent waypoint may be unavailable. In embodiments in which an image associated with waypoint $W_n$ overlaps an image associated with waypoint $W_{n+1}$, a keyframe may not be necessary. Rather, the video stream engine 32 may link the images together to provide a smooth transition from $W_n$ to $W_{n+1}$.

The video stream generation apparatus 102, may in some embodiments, cause display of the video stream on a user terminal 110, for example. As such, the video stream may be generated on the fly and streamed to the user terminal 110 via communication interface 24 and network 100. In some embodiments, video streams may be pre-generated, and stored on memory device 26 for subsequent retrieval and display to user terminal 110.

In some embodiments, such as indicated by operation 240, the video stream generation apparatus 102 may include means, such as communication interface 24, image engine 30, map routing engine 28, processor 20, or the like, for receiving metadata associated with the at least one waypoint or image. As described in further detail with respect to operations 250 and 260 hereinafter, the video stream engine 32 may determine the dynamic perceived speed and/or viewing angle based on metadata. The metadata may be provided by image engine 30 in conjunction with the images, for example, or by map routing engine 28, in conjunction with the route planning or waypoint identification. Additionally or alternatively, the video stream engine may receive the metadata separately from the image engine 30 and/or map routing engine 28, such as via network 100, and may associate the metadata with images based on location information, for example. The metadata may include any data or information that provides context to the waypoints, associated images, and/or locations, such as indications of landmarks, points of interest, or the like.

At operation 250, the video stream generation apparatus 102 may include means, such as processor 20, video stream engine 32, or the like, for changing the perceived speed for a portion, or segment, of the video stream, based on a context. The context may be inferred from the metadata, as described above, or may be based on the use of the video stream (e.g., navigation, or touring). Depending on the context, whether inferred from metadata and/or the use of the video stream, the video stream engine 32 may advantageously vary the perceived speed at which an object "moves" along a route and/or the perceived angle from which the surroundings are viewed to provide a more realistic and/or useful video stream.

For example, a video stream generation apparatus 102 may be used in a navigation system to provide a user a "walk-through" or "drive through" of a route, prior to or during the navigation so that the user may refer to actual surroundings and how they will change from different viewpoints during the navigation. As such, the video stream engine 32 may cause a slowing of the perceived speed near a confusing intersection (as identified by the metadata), for example, or an increase in speed during straightaway portions. Similarly, the perceived viewing angle may turn or rotate (e.g., mimicking a head turn) towards a directional sign or landmark that may better assist in navigation that may not otherwise have been captured in a video stream utilizing a constant perceived viewing angle. The metadata may therefore act as a queue to the video stream engine 32, to slow or speed the perceived movement and/or change a perceived viewing angle while generating the video stream.

Additionally or alternatively, other context information related to the route or situation may impact the perceived speed and viewing angle. For example, other factors may include whether the video stream is displayed from the perspective of a user who is walking (e.g., slower perceived speed) or driving (e.g., faster perceived speed), and/or a distance of the route (replication of a long trip may require a faster perceived speed). Elevation changes along a route, as identified and provided by map routing engine 28, for example, may cause the perceived speed to decrease going uphill and the perceived viewing angle to focus downward, for example, while a perceived speed experienced while traveling downhill may increase and the perceived viewing angle may focus upward. As such, basing perceived speeds and/or viewing angles on the context may allow the video stream engine 32 to produce more realistic video streams.

In another example embodiment, a user may rely on video stream generation apparatus 102 to provide a realistic "walking tour" of an area prior to or instead of a visit to the physical location. As such, the video stream engine 32 may adjust the perceived speed and/or viewing angle based on the context. More specifically, the video stream engine 32 may generate the video stream such that the speed slows at a point of interest, based on the context provided in the metadata. In some embodiments, the perceived speed of movement along a route may stop, and the viewing angle may fully rotate, allowing a user to virtually stop, and turn as much as 360 degrees to appreciate a view or historic surroundings, for example. In some embodiments, the video stream engine 32 may create a blurring effect while slowing a speed of perceived movement, or the perceived viewing angle, for example. The blurring may be introduced, for example, when changing the video stream to focus on a landmark or point of interest, thereby creating realistic visual effects.

While operation 250 describes automatic changes to the perceived speed and/or viewing angle, at operation 260, the video stream generation apparatus 102 may include means, such as video stream engine 32, communication interface 24, user interface 22, and/or processor 20, for changing the perceived speed and/or viewing angle for a portion of the video stream based on a user input. For example, the video stream generation apparatus 102 may be used in embodiments such a self-guided virtual walking tour, where a user may pause, slow, or speed the tour by providing a user input such as selection of a button or click and drag of a slider. Similarly, a user may change a viewing angle by panning with a pointing device on a display, for example.

To accomplish realistic changes in perceived speed, video stream engine 32 may generate timestamps and associate the timestamps with the images or frames, on memory device 26, for example. Upon changing in the perceived speed, the video stream engine 32 may account for the changes by adjusting timestamps for adjacent frames or frames in close proximity proportionally as to create a realistic change in speed. To accomplish realistic changes in perceived viewing angles, absolute locations of images or frames may be stored to memory device 26, but updated with relative location information based on the perceived viewing angle.

In some embodiments, at operation 270, the video stream generation apparatus 102 may include means, such as video stream engine 32, for generating a second video stream providing a perspective of traveling from the second location to the first location at a dynamic perceived speed and from a dynamic perceiving viewing angle. As such, a return trip from the destination back to the starting point may be captured in a video stream, relying on any of operations 200-260, where point A and B are reversed.

As described above, video streams generated by video stream engine 32 may be generated and streamed across network 100, and/or stored on memory device 26, for example. The dynamic behavior of the video streams, allowing viewers to initiate a slowdown or playback, for example, does not necessarily increase the final size of the video files largely because of spatial and temporal redundancy-based video compression techniques.

In some embodiments, the realistic effects created by the video stream engine 32 may be further improved by incorporating audio into the video stream. For example, a text to speech system may be used to recite the name of a landmark or point of interest. Similarly, realistic noises, such as background noises or noises associated with objects displayed in the video stream may be incorporated into the video stream to provide for realistic sound effects.

As described above, FIG. 2 illustrates a flowchart of operations performed by a video stream generation apparatus 102. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of a video stream generation apparatus 102 employing an embodiment of the present invention and executed by a processor 20 of the video stream generation apparatus 102. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included as indicated by the blocks shown with a dashed outline in FIG. 2. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an indication of a first location and a second location;
   identifying at least one waypoint on a route from the first location to the second location;
   identifying at least one image associated with the at least one waypoint; and
   causing display of a video stream generated with a processor based on the at least one image, wherein the video stream provides a perspective of traveling from the first location to the second location at a dynamic perceived speed and from a dynamic perceived viewing angle, wherein at least the dynamic perceived viewing angle changes during the generated video stream based on metadata associated with the at least one waypoint on the route from the first location to the second location.

2. A method according to claim 1, further comprising:
   causing a change in at least one of the perceived speed or the perceived viewing angle for at least one portion of the video stream based on a user input.

3. A method according to claim 1, further comprising:
   automatically causing a change in at least one of the perceived speed or the perceived viewing angle for at least one portion of the video stream based on a context.

4. A method according to claim 1, further comprising:
   generating a second video stream providing a perspective of traveling from the second location to the first location at a dynamic perceived speed and from a dynamic perceived viewing angle.

5. A method according to claim 1, wherein the at least one image comprises overlapping images associated with the at least one waypoint.

6. The method of claim 1, further comprising:
   causing provision of user selections of vehicle navigation and pedestrian navigation, wherein the dynamic perceived speed of the video stream is based on the user selection of the vehicle navigation or the pedestrian navigation.

7. The method of claim 1, wherein the dynamic perceived viewing angle changes based on a detected landmark.

8. An apparatus comprising at least one processor and at least one memory including computer program code, the at least one memory and the computer program code configured to, with the processor, cause the apparatus to at least:
   receive an indication of a first location and a second location;
   identify at least one waypoint on a route from the first location to the second location;
   identify at least one image associated with the at least one waypoint; and
   cause display of a video stream generated based on the at least one image, wherein the video stream provides a perspective of traveling from the first location to the second location at a dynamic perceived speed and from a dynamic perceived viewing angle, wherein at least the dynamic perceived viewing angle changes during the generated video stream based on metadata associated with the at least one waypoint on the route from the first location to the second location.

9. An apparatus according to claim 8, wherein the at east one memory and the computer program code are further configured to, with the processor, cause the apparatus to at least:
   cause a change in at least one of the perceived speed or the perceived viewing angle for at least one portion of the video stream based on a user input.

10. An apparatus according to claim 8, wherein at least one memory and the computer program code are further configured to, with the processor, cause the apparatus to at least:
    automatically cause a change in at least one of the perceived speed or the perceived viewing angle for at least one portion of the video stream based on a context.

11. An apparatus according to claim 8, wherein the at east one memory and the computer program code are further configured to, with the processor, cause the apparatus to at least:
    generate a second video stream providing a perspective of traveling from the second location to the first location at a dynamic perceived speed and from a dynamic perceived viewing angle.

12. An apparatus according to claim 8, wherein the at east one image comprises overlapping images associated with the at least one waypoint.

13. The apparatus of claim 8, wherein the at least one memory and the computer program code are further configured to, with the processor, cause the apparatus to at least;
    cause provision of user selection of vehicle navigation and pedestrian navigation, wherein the dynamic perceived speed of the video stream is based on the user selection of the vehicle navigation or the pedestrian navigation.

14. The apparatus of claim 8, wherein the dynamic perceived viewing angle changes based on a detected landmark.

15. A computer program product comprising at least one non-transitory computer-readable storage medium having computer-executable program code instructions stored therein, the computer-executable program code instructions comprising program code instructions to:
    receive an indication of a first location and a second location;
    identify at least one waypoint on a route from the first location to the second location;
    identify at least one image associated with the at least one waypoint; and
    cause display of a video stream generated based on the at least one image, wherein the video stream provides a perspective of traveling from the first location to the second location at a dynamic perceived speed and from a dynamic perceived viewing angle, wherein at least the dynamic perceived viewing angle changes during the generated video stream based on metadata associated with the at least one waypoint on the route from the first location to the second location.

16. A computer program product according to claim 15, wherein the computer-executable program code instructions further comprise program code instructions to:

cause a change in at least one of the perceived speed or the perceived viewing angle for at least one portion of the video stream based on a user input.

17. A computer program product according to claim 15, wherein the computer-executable program code instructions further comprise program code instructions to:
   automatically cause a change in at least one of the perceived speed or the perceived viewing angle for at least one portion of the video stream based on a context.

18. A computer program product according to claim 15, wherein the computer-executable program code instructions further comprise program code instructions to:
   generate a second video stream providing a perspective of traveling from the second location to the first location at a dynamic perceived speed and from a dynamic perceived viewing angle.

19. A computer program product according to claim 15, wherein the at east one image comprises overlapping images associated with the at least one waypoint.

20. The computer program product of claim 15, wherein the computer-executable program code instructions further comprise program code instructions to:
   cause provision of user selection of vehicle navigation and pedestrian navigation, wherein the dynamic perceived speed of the video stream is based on the user selection of the vehicle navigation or the pedestrian navigation.

* * * * *

UNITED STATES PATENT AND TRADEMARK OFFICE
CERTIFICATE OF CORRECTION

PATENT NO. : 9,197,682 B2
APPLICATION NO. : 13/723284
DATED : November 24, 2015
INVENTOR(S) : You

It is certified that error appears in the above-identified patent and that said Letters Patent is hereby corrected as shown below:

In the claims:

Column 12,
Lines 10, 24, and 32, "the at east" should read --the at least--.

Column 13,
Line 18, "the at east one" should read --the at least one--.

Signed and Sealed this
Third Day of May, 2016

Michelle K. Lee
*Director of the United States Patent and Trademark Office*